United States Patent
Solomon (12)

(10) Patent No.: US 6,216,722 B1
(45) Date of Patent: Apr. 17, 2001

(54) FREEZE-RESISTANT HYDRANT

(76) Inventor: Fred D. Solomon, 828 Annondale Ct., Columbia, SC (US) 29212

( * ) Notice: Subject to any disclaimer, the term of this patent is extended or adjusted under 35 U.S.C. 154(b) by 0 days.

(21) Appl. No.: 09/247,210

(22) Filed: Feb. 9, 1999

(51) Int. Cl.[7] .......................... F16K 49/00; F16K 59/16; E03B 7/12
(52) U.S. Cl. .......................... 137/297; 137/301; 137/334; 137/340; 137/375; 137/801; 137/849; 138/32; 165/45; 165/104.21
(58) Field of Search .................. 137/294, 297, 137/301, 302, 334, 340, 341, 375, 801, 849; 138/32, 34; 165/45, 47, 104.21; 239/571

(56) References Cited

U.S. PATENT DOCUMENTS

| | | | | |
|---|---|---|---|---|
| 105,830 | * | 7/1870 | Moore | 137/297 |
| 171,228 | * | 12/1875 | Kent | 138/32 |
| 862,593 | * | 8/1907 | Steiner | 137/297 |
| 865,927 | * | 9/1907 | Moore | 138/32 |
| 1,322,014 | * | 11/1919 | Hanna | 138/32 |
| 2,062,246 | * | 11/1936 | Atkinson | 138/32 |
| 2,908,283 | * | 10/1959 | Kiffer et al. | 137/849 |
| 2,937,009 | * | 5/1960 | Anderson | 137/301 |
| 3,023,767 | * | 3/1962 | Woodford | 137/849 |
| 3,200,833 | * | 8/1965 | McColl | 137/334 |
| 3,913,602 | * | 10/1975 | Yoon | 137/375 |
| 4,798,239 | * | 1/1989 | Persohn et al. | 137/334 |

* cited by examiner

Primary Examiner—George L. Walton
(74) Attorney, Agent, or Firm—Renner, Kenner, Greive, Bobak, Taylor & Weber

(57) ABSTRACT

A freeze-resistant hydrant (10, 110) extending between a first area having a temperature at least intermittently below freezing and a second area having a temperature constantly above freezing including, a heat-transfer tube (20, 120), a first end (21, 121) of the heat-transfer tube proximate the first area, a second end (22, 122) of the heat-transfer tube extending into the second area, a water line (35, 135) interposed within the heat-transfer tube from a location within the second area to the first end of the heat-transfer tube, a control valve (50, 150) on the, water line in proximity to the heat-transfer tube, and a heat-transfer fluid (R,R) in the heat-transfer tube for transferring heat from the second end of the heat-transfer tube to the control valve.

19 Claims, 2 Drawing Sheets

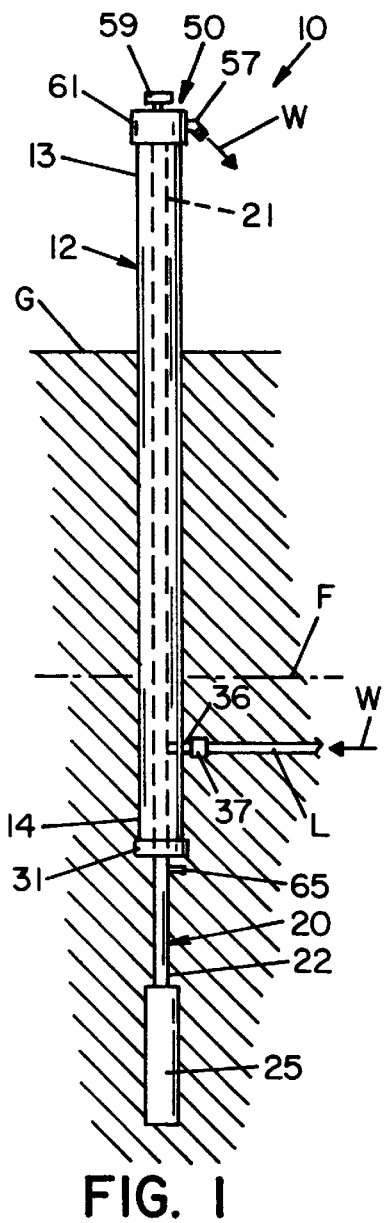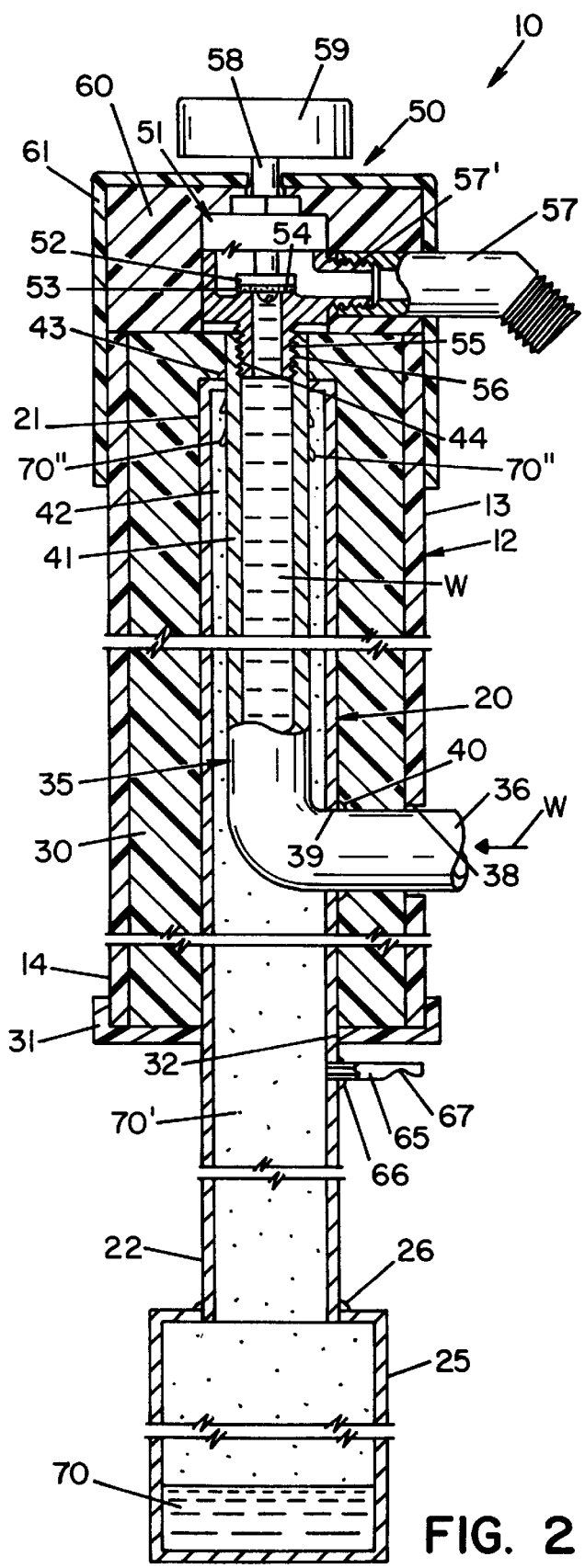

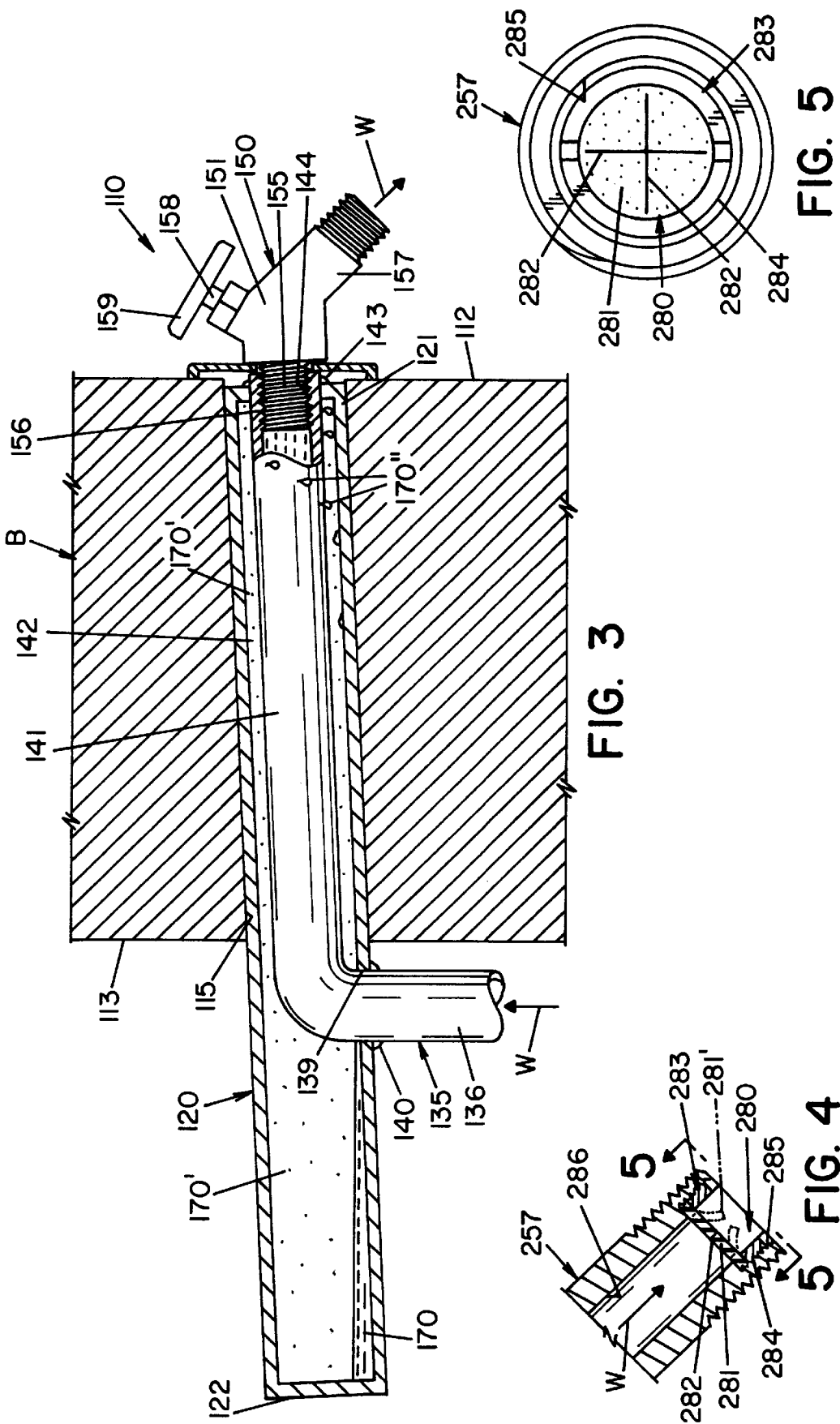

FREEZE-RESISTANT HYDRANT

TECHNICAL FIELD

In general, the present invention relates to hydrants employed for intermittently dispensing water. More particularly, the present invention relates to a freeze-resistant hydrant. Specifically, the present invention relates to a yard or building hydrant assembly that employs a regenerative heat-transfer medium to continuously maintain an above-ground valve and water supply pipe at a temperature that precludes freezing.

BACKGROUND ART

Yard hydrants have long been employed to dispense water supplied by underground water pipes at various locations where needed. For the most part, these hydrants can be relatively simple and inexpensive, yet provide reliable service over extended time periods. A problem arises, however, in areas where below-freezing temperatures are encountered because the valve pipes and control valves are commonly located at or a few feet above ground level and thus are fully exposed to outside temperatures. When water in a control valve or water pipe freezes, the expansion of the water in its frozen state often causes damage to a control valve or pipe. Thereafter, when the frozen water thaws, the water uncontrollably escapes, thereby creating the possibility of water damage, besides the loss of valuable water supply.

In some applications, it is possible to merely shut off the water pressure source to the hydrant when there is a chance of freezing temperatures and to drain down the exposed portion of the water line above ground and a distance below the surface of the ground to a depth below the frost line for a particular geographic area. In many other applications, it is not possible to merely shut down the hydrant in this manner during potentially freezing weather conditions due to the necessity to have it continually operable for purposes of watering livestock or the like.

In some instances, electrical heating elements have been employed to prevent water in hydrants from freezing. However, such heating devices are relatively expensive, require substantial work and expense to install and maintain, and tend to consume substantial electrical power in employing relatively inefficient electrical resistance units. In addition, there are a vast number of locations where hydrants are installed that electrical power is not readily available. Further, a loss of electrical power, even for a short time period, can result in the water freezing and the attendant damage to the pipe and/or control valve.

The other approach that has been emplpoyed to prevent freezing besides permanent shutdown or the use of a heat source to maintain the water above freezing involves systems that effect a temporary drain down any time that water flow is discontinued. Some such systems employ a stop cock position led below the freezing line with provision for draining the water from the vertical pipe between the stop cock and the above-ground control valve. In some instances, this is effected by employing a small weep hole in the vertical pipe below ground and normally proximate to the below-ground stop cock. Such weep holes are normally on the order of one-sixteenth of an inch in diameter to permit the water to drain into the ground. Systems of this type do have disadvantages. First, it is possible for contaminated water in the ground to enter the weep hole and contaminate the water when the stop cock is opened and water flow to the control valve is resumed. A common source of such contaminated water arises from usage of a spray nozzle for dispensing insecticides and fertilizers where back flow through the weep hole may result and the water source may be thus contaminated. Another problem with the weep hole approach is that rust may readily form at the weep hole after a period of time and result in blockage of the weep hole. In such instance, the water is unable to drain down, which, upon the occurrence of freezing temperatures can result in damage and breaking of the vertical pipe and/or the control valve.

Another type of temporary drain-down system contemplates connecting the vertical pipe to a tank, which permits water in the vertical pipe to drain down into the tank. In such systems, a venturi is positioned in the line, such that the tank is pumped out when water flow is resumed so that it is then ready to receive drain-down water when water flow is again discontinued. While this system is a closed system that does not permit discharge of water into the ground or possible return flow of contaminated ground water, there is nevertheless a build-up of bacteria in the tank that is expelled when water flow is resumed, particularly when the hydrant stands for substantial time periods without being actuated to clear the tank.

Thus, all known systems for preventing freezing of yard hydrants and the like are subject to limitations and disadvantages that can result in either the water becoming contaminated or in freezing of the water under circumstances that are likely to intermittently occur.

DISCLOSURE OF THE INVENTION

Therefore, an object of the present invention is to provide a freeze-resistant yard hydrant that is a closed system that does not rely upon the egress of water to and possible ingress of water from the surrounding soil. Another object of the present invention is to provide such a yard hydrant that does not rely upon the presence and continuity of electrical power to the yard hydrant assembly. A further object of the present invention is to provide such a yard hydrant that employs a regenerative heat-transfer medium in a sealed heat-transfer tube that migrates within said heat-transfer tube to transfer underground heat to the control valve and a portion of the water delivery for the hydrant.

Another object of the present invention is to provide a freeze-resistant yard hydrant employing a heat-transfer medium in the form of a fluid with a boiling point under vacuum of approximately 30 degrees Fahrenheit in a closed container that, with underground warming, creates a vapor that rises and contacts the cooler water line and control valve that condenses the vapor, such that it returns to the below-ground location in a liquid form. A further object of the present invention is to provide such a yard hydrant assembly wherein the heat-transfer tube enclosing a heat-transfer fluid extends from a position below ground, where the temperature is substantially above freezing, upwardly to encompass the vertical portion of the water line and to a position in proximity to the control valve at the top of the water pipe. A further object of the invention is to provide such a yard hydrant wherein a heat-transfer tube is evacuated prior to the introduction of the heat-transfer fluid to preclude the formation of entrapped air pockets in said heat-transfer tube. A further object of the present invention is to provide such a yard hydrant assembly wherein the heat-transfer tube extends a sufficient distance below the water line and has a sufficient surface area so as to provide a temperature differential whereby the heat-transfer mediumn maintains water in the water line and control valve at a temperature above freezing at the most extreme lower range of air temperature encountered in a geographic area where the hydrant is installed.

Still another object of the present invention is to provide a freeze-resistant yard hydrant assembly that is capable of operating for extended time periods without the necessity for servicing, maintenance, or other attention. Yet another object of the present invention is to provide such a yard hydrant that is relatively inexpensive in terms of material and installation costs and that is essentially cost-free thereafter in operation. Yet another object of the invention is to provide such a yard hydrant that may be readily installed by persons without technical expertise in that the configuration is relatively non-complex and does not require any extent of calibration or other adjustment upon installation or in subsequent operation.

In general, the present invention contemplates a freeze-resistant hydrant extending between a first area having a temperature at least intermittently below freezing and a second area having a temperature constantly above freezing including, a heat-transfer tube, a first end of the heat-transfer tube proximate the first area, a second end of the heat-transfer tube extending into the second area, a water line interposed within the heat-transfer tube from a location within the second area to the first end of the heat-transfer tube, a control valve on the water line in proximity to the heat-transfer tube, and a heat-transfer fluid in the heat-transfer tube for transferring heat from the second end of the heat-transfer tube to the control valve.

BRIEF DESCRIPTION OF THE DRAWINGS

FIG. 1 is an elevational view, with portions shown in section, of a water hydrant assembly according to the concepts of the present invention shown mounted in operative relation to ground level and a conventional underground water line.

FIG. 2 is an enlarged fragmentary elevational view, partially in section, of the water hydrant assembly of FIG. 1 showing details of the components and the interrelation therebetween.

FIG. 3 is a side-elevational view of a modified water hydrant assembly adapted for mounting in a building wall embodying the concepts of the present invention.

FIG. 4 is a fragmentary sectional view of a modified form of valve nozzle useable with the hydrants of either FIG. 1 or FIG. 3.

FIG. 5 is an enlarged view of the valve nozzle of FIG. 4 taken substantially along the line 5—5 of FIG. 4.

PREFERRED EMBODIMENT FOR CARRYING OUT THE INVENTION

A water hydrant assembly according to the concepts of the present invention is generally indicated by the numeral 10 in FIGS. 1 and 2 of the drawings. The water hydrant assembly 10 has a vertically-positioned casing, generally indicated by the numeral 12, of substantial extent that defines the exterior of water hydrant assembly 10. As shown, the casing 12 may be a tubular member having an external diameter of several inches. The casing 12 is preferably constructed of a plastic tubing, such as PVC or other relatively good thermal insulating material.

Referring particularly to FIG. 1, the casing 12 has a top portion 13 that extends a distance above ground level G for purposes of dispensing water W at a convenient position above ground for purposes of ease of filling tanks, buckets, containers, or hoses into which the flow of water W is to be directed. The casing 12 also has a bottom portion 14 that extends below ground a distance below the frost line F for the geographic area where the water hydrant assembly 10 is to be installed and normally to and a distance below a water supply line L, which may be of conventional configuration and connected directed or indirectly to a pump and/or water source in a conventional manner.

Referring particularly to FIG. 2, positioned interiorly of casing 12 is a heat-transfer tube, generally indicated by the numeral 20. The heat-transfer tube 20 is shown in a cylindrical configuration, which may advantageously be positioned medially of or coaxially of the casing 12 to form an annular passage therebetween. Heat-transfer tube 20 has an upper end 21 that terminates proximate to the upper extremity of top portion 13 of casing 12. Heat-transfer tube 20 has a lower end 22 that extends a distance below the bottom portion 14 of casing 12. The lower end 22 of heat-transfer tube 20 may be provided with a heat exchanger 25 surrounding the extremity of lower end 22. The heat exchanger 25 is preferably positioned approx mately four feet or more below the frost line in the particular geographic area in which the water hydrant assembly 10 is to be installed. Heat exchanger 25 is thus preferably at a depth below ground level G, such that the proximate ground temperature is on the order of 12 to 18 degrees Fahrenheit or more above freezing temperature of 32 degrees Fahrenheit.

As shown, the heat exchanger 25 may be of a larger diameter than heat-transfer tube 20 for purposes of providing an enlarged surface area capable of transferring a greater quantity of heat interiorly thereof. The heat exchanger 25 is preferably constructed of a metal that is a good thermal conducting material. In colder climates, it may be advantageous to enlarge the heat exchanger 25 or employ specialty tubing in the nature of what are known as Delta "T" twist tubes, a tube having radially-projecting fins, or other configuration known in the heat-exchanger field as providing increased surface area while retaining a thin wall construction.

The lower end 22 of heat-transfer to be 20 has a seal 26 at the entry to heat exchanger 25 and may extend a distance axially therein. The heat-transfer tube 20 is preferably constructed of a plastic tubing or other relatively good thermal insulating material to preclude the transfer of heat therein into the ground or into casing 12 and thus to the ground or the air in the bottom portion 14 or top portion 13, respectively, of casing 12. The annular passage between the exterior surface of heat-transfer tube 20 and casing 12 may advantageously be filled with insulation 30, which, as shown, is a type of particulate insulation material to further isolate heat-transfer tube 20 from air temperature above ground level G and soil temperature above the frost line F, respectively. A cap 31 having a bore 32 to receive heat-transfer tube 20 may enclose the bottom of casing 12 to prevent moisture from derrogating the insulation 30.

A water-delivery line, generally indicated by the numeral 35, extends into the heat-transfer tube 20 and communicates with the water-supply line L. As shown, the water-delivery line 35 is generally L-shaped, with a horizontal leg 36 that is attached to water-supply line L via an in-line connector 37 (see FIG. 1). The horizontal leg 36 of water-delivery line 35 extends through an aperture 38 in the casing 12 and a hole 39 in heat-transfer tube 20. In order to maintain the fluid-tight integrity of heat-transfer tube 20, a peripheral seal 40 surrounds horizontal leg 36 of water-delivery line 35 at the hole 39 in heat-transfer tube 20. The water-deliver line 35 has a vertical leg 41 that extends upwardly within heat-transfer tube 20 to a position slightly vertically above the upper end 21 of heat-transfer tube 20. As shown, vertical leg 41 of water-delivery line 35 may be positioned coaxially within heat-transfer tube 20 with an annular channel 42 being formed therebetween. The annular channel 42 is of a radial extent sufficient to permit drainage of fluid drops along the exterior wall of water-delivery line 35 and/or the inner wall of heat-transfer tube 20 for a reason to be explained hereinafter. The vertical leg 41 of water-delivery line 35 is also provided with a fluid-tight peripheral seal 43, which makes annular channel 42 a vertically, upwardly-sealed compartment. The water-delivery line 35 is preferably advantageously made of copper or other relatively good thermal conducting material.

The upper extremity of vertical leg 41 of water-delivery line 35 communicates with a control valve assembly, generally indicated by the numeral 50. The control valve assembly 50 has what may be a conventional valve 51 having a valve element 52 carrying a seal 53, which are movable relative to a valve seat 54. Projecting from valve seat 54 is a neck 55 that has external threads 56 for matingly engaging internal threads 44 at the vertical upper extremity of vertical leg 41 of vater-delivery line 35. The valve 51 also has a nozzle 57 for directing water W and valve stem 58 for moving the valve element 52 in and out of engagement with valve seat 54. The nozzle 57 may have threads 57' for detachable engagement with the remainder of valve 51 for ease of replacement in the event it is damaged. Nozzle 57 may also be advantageously constructed of a relatively good insulating material due to its exposure to ambient air temperature.

The valve 51 may be any of a variety of commercially available water valves; however, it is preferred that the type selected have the valve seat 54 located relatively close to the neck 55 to which water-delivary line 35 is attached and to the upper extremity of the upper end 21 of heat-transfer tube 20. Valve stem 58 is preferably provided with a plastic handle 59 to afford an extent of protection from outside temperatures to the valve stem 58. Similarly, an insulating cap 60 may surround valve 51 in the area above insulation 30 within casino 12. The entirety of valve 51, except for nozzle 57, stem 58, and handle 59, may be located within a cylindrical closure 61 that overlaps the extremity of the top portion 13 of casing 12. Cylindrical closure 61 may be constructed of a relatively non-heat conductive material, such as a plastic, to further assist in insulating valve 51 from the ambient outside temperature.

It is to be appreciated that heat-transfer tube 20 forms a closed chamber about the vertical leg 41 of water-delivery line 35 and extends downwardly to include the heat exchanger 25. The heat-transfer tube 20 is provided with a fill tube 65 that extends through its wall and several inches outwardly thereof. A circumferential seal 66 assures fluid-tight integrity at the juncture of fill tube 65 and the heat-transfer tube 20.

Once assembled and interconnected with a water supply line L in a manner shown in the drawings and described hereinabove, the freeze-resistant feature of water hydrant assembly 10 may be actuated. This is effected by attaching fill tube 65 to a vacuum source of approximately 30 inches of mercury to insure that no significant air content remains within the heat-transfer tube 20 or heat-exchanger 25. Thereafter, a quantity of liquid refrigerant 70 is introduced into the heat-transfer tube 20 via the tube 65, at which time the tube 65 is pinched off as by collapsing at the indentation 67. In order to maintain an airtight seal, tube 65 may then be soldered or otherwise permanently sealed. The fluid form refrigerant 70 accumulates in the heat exchanger 25 where it is exposed to underground temperature of a magnitude previously indicated. The liquid refrigerant 70 may be Freon 236 or other non-toxic refrigerant having a boiling point of approximately 30 degrees Fahrenheit, which is well below the ambient ground temperature transferred to liquid refrigerant 70 by the heat exchanger 25. The liquid refrigerant 70, therefore, boils in heat exchanger 25 effecting conversion to vapor form refrigerant 70' that fills the heat-transfer tube 20. A portion of the vapor form refrigerant 70' reaches the upper end 21 of heat-transfer tube 20 proximate valve 51, which, in being exposed to ambient outside air temperature via valve 51, is sufficiently cool to condense the vapor form refrigerant 70', to liquid refrigerant drops 70", while giving up substantial heat to valve 51 in the change of state to prevent water proximate to valve seat 54 from freezing. The liquid refrigerant drops 70" move downwardly in annular channel 42 from the upper extremity of upper end 21 of heat-transfer tube 20 to rejoin the liquid refrigerant 70 in heat exchanger 25 preparatory to being later converted to vapor as part of a continuing cycle. This cycle is operative whenever valve 51 reaches a low enough temperature to condense vapor form refrigerant 70' within heat-transfer tube 20.

A modified water hydrant assembly according to the concepts of the present invention adapted for mounting on a building wall B is generally indicated by the numeral 110 in FIG. 3 of the drawings. As shown, the building wall B has an external surface or area 112 that is exposed to the ambient outside temperature in an area where water hydrant assembly 110 would be installed has temperatures at least intermittently below freezing. The building wall B also has an internal surface or area 113 that is maintained at above freezing temperatures and, in the instance of a heated building, may be substantially above freezing temperature at all times.

The building wall B has a through hole 115 into which a heat-transfer tube, generally indicated by the numeral 120, extends. The through hole 115 and heat-transfer tube 120 are preferably angled downwardly slightly from the horizontal as viewed from right to left in FIG. 3 for a purpose to be indicated hereinafter. The heat-transfer tube 120 has an end 121 terminating proximate the external surface 112 and an opposite end 122 terminating within the internal surface 113.

A water-delivery line, generally indicated by the numeral 135, extends into the heat-transfer tube 120 and communicates with a water supply line (not shown) constituting a portion of the water supply system within the building to thus provide a constant supply of water W. As shown, the water-delivery line 135 is generally L-shaped, with a vertical leg 136 attached to the water supply and extending through a hole 139 in heat-transfer tube 120. A peripheral seal 140 surrounds vertical leg 136 to maintain fluid-tight integrity of transfer tube 110 at the hole 139. The water-delivery line 135 has a horizontal leg 141 that extends within heat-transfer tube 120 to a position slightly horizontally outwardly of the end of heat-transfer tube 120 proximate the external wall 112. Horizontal leg 141 of water-delivery line 135 may be positioned coaxially within heat-transfer tube 120 with an annular channel 142 being formed therebetween sized in the manner of annular channel 42 of water hydrant assembly 10. The horizontal leg 141 of water-delivery line 135 is provided with a fluid-tight peripheral seal 143 at the extremity of heat-transfer tube 120, which makes annular channel 142 and heat-transfer tube 120 in its entirety a sealed compartment.

The outer extremity of horizontal leg 141 of water-delivery line 135 communicates with a control valve assembly, generally indicated by the numeral 150. The control valve 150 may be any of a number of conventional valve configurations having the basic components described above in conjunction with valve 51. As shown, control valve assembly 150 includes a projecting neck 155 that has external threads 156 for matingly engaging internal threads 144 at the out extremity of horizontal leg 141 of water-delivery line 135. The valve assembly 50, and particularly valve 151, also has a valve stem 158, handle 159, and nozzle 157. The enumerated elements of valve 150 and those not shown in FIG. 3 operate in conventional fashion for a valve 151 of the type herein contemplated.

It will be appreciated that the above described components of water hydrant assembly 110 exhibit the same characteristics, are constructed of the same materials, and otherwise are in accordance with the comparable components discussed hereinabove in conjunction with water hydrant assembly 10. Actuation and operation of water hydrant assembly 110 is essentially in accordance with the above-described operation of water hydrant assembly 10. In particular, the heat-transfer tube 120 is evacuated via a fill tube (not shown) and charged with a liquid refrigerant 170 which may be the same as liquid refrigerant 70 or possess similar characteristics. As can be seen from FIG. 3, the liquid refrigerant 170 accumulates in the extremity of heat-transfer tube 120 interiorly of the internal surface 113 of building wall B due to the angular positioning of heat-transfer tube 120. The liquid refrigerant 170 boils in heat-transfer tube 120, effecting conversion to vapor form refrigerant 170', which fills heat-transfer tube 120. A portion of the vapor form refrigerant 170' reaches the end of heat transfer tube 120 proximate exterior wall 112, which, in being exposed to ambient outside temperature, is sufficiently cool to condense to the vapor form refrigerant 70'to liquid refrigerant drops 170" while giving up substantial heat to valve 151 in the change of state to prevent water in valve assembly 150 from freezing. Gravity then serves to transport the drops of liquid refrigerant 170" along horizontal leg 141 of water-delivery line 135 and/or the inner wall of heat-transfer tube 120 to the fluid pool of liquid refrigerant 170 in the position depicted in FIG. 3.

A modified form of valve nozzle is generally indicated by the numeral 257 in FIGS. 4 and 5. The nozzle 257 may be employed with either the water hydrant assembly 10 or the modified water hydrant assembly 110. The nozzle 257 is particularly adapted for use in applications where low outside temperatures are encountered and where wind conditions and the configuration of valve assembly 50, 150 is such that wind conditions may direct air into essentially direct contact with the valve seat 54.

To preclude such direct wind impingement, the nozzle 257 is provided with a sealing disc assembly, generally indicated by the numeral 280. The sealing assembly 280 includes a flexible disc 281, which may be made of any suitable elastomeric material that retains reasonable flexibility at the lower range of outdoor temperatures. The flexible disc 281 is preferably perforated with two or more through slits 282, which may be generally diametrically arranged and in sufficient number such as to permit substantially unimpeded flow of water W out of nozzle 257 while closing the nozzle to air flow when there is no flow of water W. The disc 281 is shown in the deflected position 281' permitting flow of water W in FIG. 4. The disc 281 is retained in nozzle 257 by a sleeve 283 that may have external threads 284 that matingly engage threads 285 located in the bore 286 of nozzle 257. The disc 281 may be replaced by merely unscrewing sleeve 283, removing a used disc 281, seating a new disc 281, and reseating the sleeve 283, as seen in FIG. 4.

Thus, it should be evident that the freeze-resistant yard hydrant disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A freeze-resistant hydrant comprising, a casing having a top extending a distance above ground and a bottom extending below ground, a heat-transfer tube, a first end of said heat-transfer tube proximate said top of said casing, a second end of said heat-transfer tube extending below said bottom of said casing, a water line interposed within said heat-transfer tube from a location below ground to said first end of said heat-transfer tube, a control valve on said water line in proximity to said heat-transfer tube, and a heat-transfer fluid in said heat-transfer tube for transferring heat from said second end of said heat-transfer tube to said control valve, wherein said heat-transfer tube is sealed with said heat transfer fluid provided therein subsequent to the evacuation of air sufficient to insure that no air is trapped in said heat-transfer tube proximate said control valve.

2. A hydrant according to claim 1, wherein said vacuum in said heat-transfer tube is approximately 30 inches of mercury.

3. A hydrant according to claim 2, wherein said heat-transfer fluid has a boiling point of approximately 30 degrees Fahrenheit.

4. A hydrant according to claim 1, wherein said heat-transfer tube is constructed of a relatively good heat-conductive material.

5. A hydrant according to claim 4, wherein said heat-transfer tube is made of copper.

6. A hydrant according to claim 1, wherein said heat-transfer tube and the portion of said water line interposed within said heat-transfer tube are coaxial.

7. A hydrant according to claim 1, further comprising an annular channel formed between said heat-transfer tube and said water line to permit passage of said heat-transfer fluid in a vapor state from said second end of said heat-transfer tube to said first end thereof and to permit passage of said heat-transfer fluid in a liquid state from said first end of said heat-transfer tube to the second end thereof.

8. A hydrant according to claim 1, further comprising an annular passage between said casing and said heat-transfer tube.

9. A hydrant according to claim 1, wherein said annular passage contains an insulating material.

10. A freeze-resistant hydrant according to claim 1 further comprising a fill tube communicating with the interior of said heat-transfer tube for the evacuation of air prior to the introduction of said heat-transfer fluid into said heat-transfer tube.

11. A freeze-resistant hydrant comprising, a casing having a top extending a distance above ground and a bottom extending below ground, a heat-transfer tube, a first end of said heat-transfer tube proximate said top of said casing, a second end of said heat-transfer tube extending below said bottom of said casing, a water line interposed within said heat-transfer tube from a location below ground to said first end of said heat-transfer tube, a control valve on said water line in proximity to said heat-transfer tube, a nozzle in communication with said control valve and having a perforated flexible disc to prevent flow of air into said nozzle but permit flow of water from said nozzle, and a heat-transfer fluid in said heat-transfer tube for transferring heat from said second end of said heat-transfer tube to said control valve, wherein said heat-transfer tube is sealed with said heat transfer fluid provided therein subsequent to the evacuation of air sufficient to insure that no air is trapped in said heat-transfer tube proximate said control valve.

12. A freeze-resistant hydrant according to claim 11 further comprising a fill tube communicating with the interior of said heat-transfer tube for the evacuation of air prior to the introduction of said heat-transfer fluid into said heat-transfer tube.

13. A freeze-resistant hydrant mounted in a building wall having an external surface and an internal surface comprising, a heat-transfer tube, a first end of said heat-transfer tube proximate the external surface of the building wall, a second end of said heat-transfer tube extending within the internal surface of the building wall, a water line interposed within said heat-transfer tube from a location within the internal surface of the building wall to the first end of said heat-transfer tube, a control valve on said water line in proximity to said heat-transfer tube, and a heat-transfer fluid in said heat-transfer tube for transferring heat from said second end of said heat-transfer tube to said control valve, wherein said heat-transfer tube is sealed with said heat-transfer fluid provided therein subsequent to the evacuation of air sufficient to insure that no air is trapped in said heat-transfer tube proximate said control valve.

14. A freeze-resistant hydrant according to claim 13, wherein said heat-transfer fluid has a boiling point of approximately 30 degrees Fahrenheit.

15. A freeze-resistant hydrant according to claim 13, wherein said heat-transfer tube and a portion of said water line interposed within said heat-transfer tube are coaxial.

16. A freeze-resistant hydrant according to claim 13, further comprising an annular channel formed between said heat-transfer tube and said water line to permit passage of said heat-transfer fluid in a vapor state from said second end of said heat-transfer tube to said first end thereof and to permit passage of said heat-transfer fluid in a liquid state from said first end of said heat-transfer tube to the second end thereof.

17. A freeze-resistant hydrant according, to claim 13 further comprising a fill tube communicating with the interior of said heat-transfer tube for the evacuation of air prior to the introduction of said heat-transfer fluid into said heat-transfer tube.

18. A freeze-resistant hydrant comprising a casing extending between a first area having a temperature at least intermittently below freezing and a second area having a temperature constantly above freezing, a heat-transfer tube, a first end of said heat-transfer tube proximate said first area, a second end of said heat-transfer tube extending into said second area, a water line interposed within said heat-transfer tube from a location within said second area to said first end of said heat-transfer tube, a control valve removably engaging said water line in proximity to said heat-transfer tube, a nozzle in communication with said control valve, an insulating cap enclosing said control valve, wherein, when said control valve is removed from its engagement with said water line, said insulating cap, said control valve and said nozzle may be removed as a unit from the remainder of the freeze resistant hydrant to allow for maintenance of said control valve, and a heat-transfer fluid in said heat-transfer tube for transferring heat from said second end of said heat-transfer tube to said control valve, and a fill tube communicating with the interior of said heat transfer tube for introducing heat-transfer fluid, removing air and effecting a fluid-tight seal, whereby said heat-transfer tube is sealed and has an internal vacuum sufficient to insure that no air is trapped in said heat-transfer tube proximate said control valve.

19. A freeze-resistant hydrant according to claim 18, wherein said water line extends through a hole in said heat-transfer tube.

* * * * *

UNITED STATES PATENT AND TRADEMARK OFFICE
CERTIFICATE OF CORRECTION

PATENT NO. : 6,216,722 B1  Page 1 of 1
DATED : April 17, 2001
INVENTOR(S) : Fred D. Solomon It is certified that error appears in the above-identified patent and that said Letters Patent is hereby corrected as shown below:

Column 8,
Line 29, the numeral "2" should be -- 1 --;
Line 35, the numeral "4" should be -- 1 --; and
Line 50, the numeral "1" should be -- 8 --.

Signed and Sealed this

Ninth Day of November, 2004

JON W. DUDAS
*Director of the United States Patent and Trademark Office*